Patented June 20, 1939

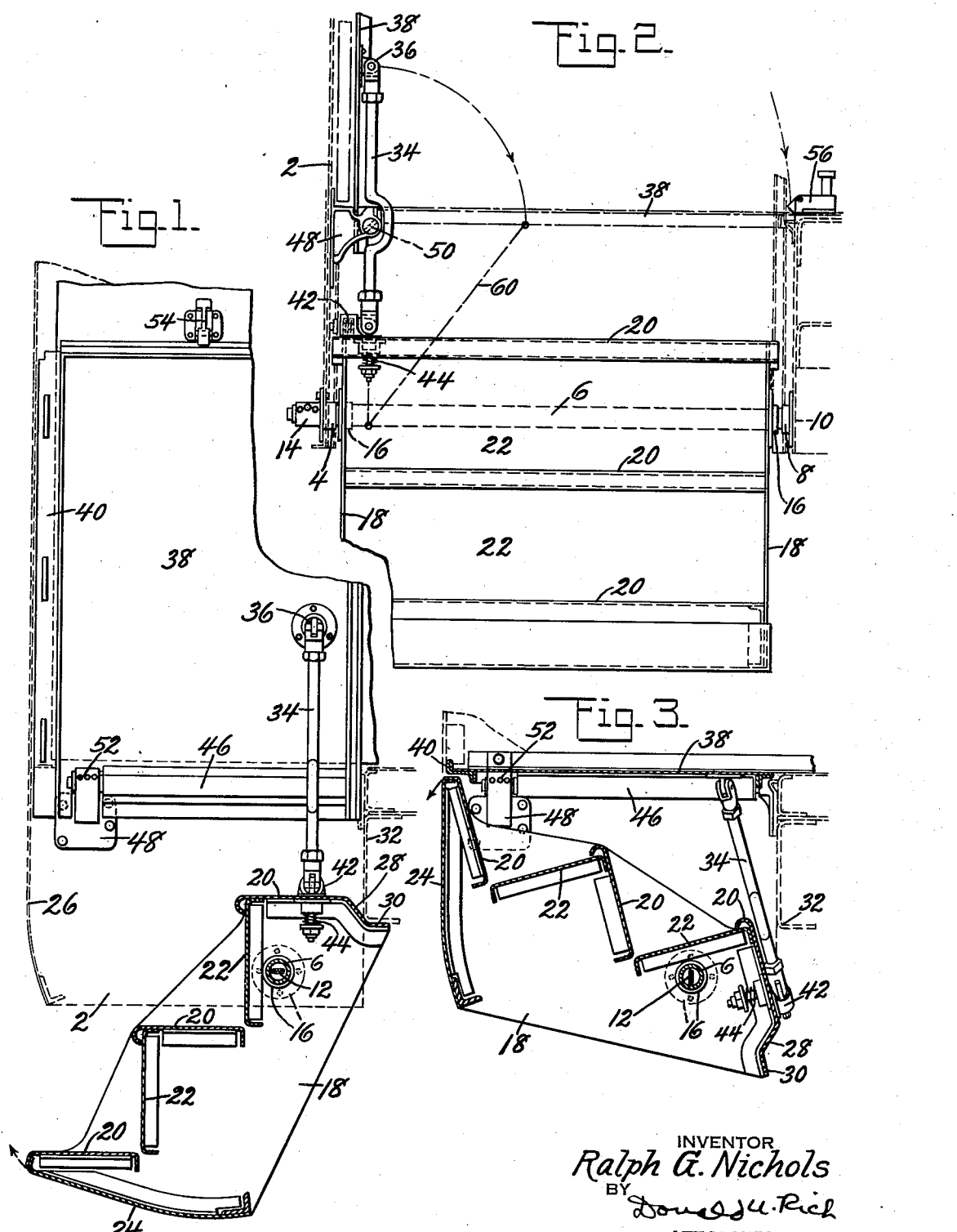

2,162,964

UNITED STATES PATENT OFFICE 2,162,964

FOLDING CAR STEP

Ralph G. Nichols, St. Charles, Mo., assignor to American Car and Foundry Company, New York, N. Y., a corporation of New Jersey Application June 5, 1936, Serial No. 83,602

1 Claim. (Cl. 105—430)

This invention deals with folding car steps in general and in particular to folding steps for streamline railway cars.

Previous car steps have been of the rigid type which is so well known in general passenger car construction and which offer considerable air resistance as well as being unsightly. Folding steps have been proposed at various times but these are of the type similar to the familiar street car type wherein a single step is projected or folded down and is unsuitable for large passenger cars that are streamlined. It is an object of the invention, therefore, to provide a set of folding steps which are bodily swingable to an out of the way position.

Another object of the invention is the provision of a set of steps having a part of the car wall attached thereto and which will close the step gap when the steps are in the inoperative position.

A further object of the invention is the provision of a set of bodily swinging steps which are connected to act in unison with a trap door.

A still further object of the invention is the provision of a set of bodily swinging steps and interconnected trap door wherein the weights are so related and balanced as to make a portion of the operation automatic.

These and other objects of the invention will be apparent to persons skilled in the art from a study of the following description and accompanying drawing in which:

Figure 1 is an end view showing the steps in section and in the lowered or operative position;

Fig. 2 is a side view showing the steps in operative position by full lines and in the inoperative position by dash and dot lines, and Fig. 3 is a sectional view similar to Fig. 1 but showing the steps in the inoperative or traveling position.

Referring now to the drawing in detail, it is seen that the car end sheet 2, or other suitable car part, carries a bearing 4 for one end of tube or hollow rod 6, the other end of which is carried in bearing 8 attached to the buffer beam cover plate 10 or other suitable car part. A flat or other shaped torsional spring 12 is placed within the tube and has one end fixed while the other end is attached to adjusting member 14 in order that the initial torsion of the spring may be adjusted. The rod or tube has attached thereto collared members 16 to which are attached step side pieces 18 connected together by treads 20 and risers 22 and also by sheet member 24 which is of the same contour as the car side wall 26. The top tread in the instance shown has an inclined portion 28 terminating in a flat portion 30 adapted to abut the under side of car frame member 32 and act as a limiting stop for the steps.

The top tread has connected thereto an adjustable length rod 34, the other end of which is connected by universal joint 36 to the underside of a trap door 38 having threshold 40 adapted to contact with the upper edge of the wall portion 24 when in the lowered position. Rubber blocks or other sound deadening and sealing means may be provided at this joint between the threshold and movable wall portion if desired. The connection between the connecting rod and the top tread is of a special movable type having compression springs 42 and 44 at right angles to each other and acting to insure a tight joint between parts as will be described later in connection with the operation.

The trap door is pivotally carried by a tube 46 bearing in brackets 48 attached to the car structure and the tube carries a torsion spring 50, the torsion of which may be adjusted by adjusting means 52 carried by one of the brackets. The trap door is held in the raised position by catch 54 and in the lowered position by catch 56.

The operation of the device is as follows: Assuming the torsion springs to be correctly adjusted and the device in the position shown in Fig. 3, or by dot and dash lines in Fig. 2. The catch 56 is tripped and the trap door springs up to an angle of about 40 degrees due to the weight of the steps aided by the stored energy of spring 50 and resisted by weight of the trap door and the storing of energy in the spring 12. The operator now grasps the trap door and raises it to the upright position in which it is held by catch 54, thus storing additional energy in spring 12 and allowing the steps to be lowered to the position shown in Fig. 1. The link 34 is so adjusted that the steps have stopped movement prior to the final latching of the trap door and the continued movement of the trap door is permitted by the compression spring 44 which thus provides a resilient connection insuring the correct position of the steps.

To lower the steps the catch 54 is tripped and the weight of the trap door aided by the stored energy of spring 12 and resisted by the weight of the steps and the storing of energy in spring 50 will again bring the parts to a balanced position holding the trap door at approximately a 40 degree or other chosen angle. The operator then simply by stepping on the trap door will cause the steps to be raised into the final position and the trap door to be held down by catch 56. During the latter part of the closing movement the steps again come to the stationary position before the trap door is closed and the door's final movement is permitted by the compression of spring 42 which thus resiliently holds the steps in the raised position with the connecting link in position 60 and insures a tight connection between the portion 24 and the car side. In this raised position of the steps it is clear that the portion 24 will fully close the gap in the side below the trap door line and present a smooth unbroken car exterior.

The mechanism has been described in more or less detail, but it is to be understood that various modifications and arrangements can be made without departing from the scope of the appended claim.

What is claimed is:

A folding step and trap door assembly for cars comprising, a flight of steps pivoted to the car for raising and lowering as a unit, resilient means tending to raise said unit, a trap door pivoted to the car for raising and lowering, resilient means tending to raise said trap door, means interconnecting said step unit and trap door for movement in unison and latch means for retaining said trap door in raised or lowered position, said resilient means being so related as to cause the step unit and trap door to assume an intermediate position upon release of said latch means.

RALPH G. NICHOLS.